(12) United States Patent
Färber

(10) Patent No.: US 11,685,272 B2
(45) Date of Patent: Jun. 27, 2023

(54) METHOD AND CHARGING COLUMN FOR RECHARGING A PLURALITY OF ELECTRIC VEHICLES

(71) Applicant: AUDI AG, Ingolstadt (DE)

(72) Inventor: Ingo Färber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 341 days.

(21) Appl. No.: 16/191,743

(22) Filed: Nov. 15, 2018

(65) Prior Publication Data
US 2019/0152335 A1   May 23, 2019

(30) Foreign Application Priority Data

Nov. 20, 2017   (DE) .......................... 102017220695.0

(51) Int. Cl.
| | |
|---|---|
| *B60L 53/14* | (2019.01) |
| *B60L 53/64* | (2019.01) |
| *B60L 53/60* | (2019.01) |
| *B60L 53/30* | (2019.01) |
| *H02J 7/00* | (2006.01) |
| *B60L 53/35* | (2019.01) |

(Continued)

(52) U.S. Cl.
CPC ............... *B60L 53/14* (2019.02); *B60L 53/30* (2019.02); *B60L 53/31* (2019.02); *B60L 53/35* (2019.02); *B60L 53/60* (2019.02); *B60L 53/64* (2019.02); *H02J 7/0013* (2013.01); *H01M 10/441* (2013.01); *H02J 2310/48* (2020.01)

(58) Field of Classification Search
CPC ......... B60L 53/14; B60L 53/31; B60L 53/35; B60L 53/30; B60L 53/60; B60L 53/64; H02J 7/00; H02J 7/0027; H01M 10/44; H01M 10/441

USPC ......................................................... 320/109
See application file for complete search history.

(56) References Cited

U.S. PATENT DOCUMENTS

| | | | | |
|---|---|---|---|---|
| 5,803,215 | A | * | 9/1998 | Henze ................. H02J 7/00036 320/109 |
| 8,890,473 | B2 | | 11/2014 | Muller et al. |
| 2010/0217485 | A1 | | 8/2010 | Ichishi |

(Continued)

FOREIGN PATENT DOCUMENTS

| | | |
|---|---|---|
| CN | 103828181 A | 5/2014 |
| CN | 104578273 A | 4/2015 |

(Continued)

OTHER PUBLICATIONS

European Search Report dated Mar. 19, 2019, in connection with corresponding EP Application No. 18200306 1 (11 pgs., including machine-generated English translation).

(Continued)

*Primary Examiner* — Edward Tso
*Assistant Examiner* — Ahmed H Omar
(74) *Attorney, Agent, or Firm* — Maier & Maier, PLLC

(57) ABSTRACT

A method for operating a charging column, in which a plurality of electric vehicles that are simultaneously connected at respective connections of the charging column are charged by means of a charging control of the charging column, wherein the charging control charges the simultaneously connected electric vehicles exclusively individually. In addition, the invention relates to a charging column with a plurality of connections for the simultaneous connection of a plurality of electric vehicles.

15 Claims, 1 Drawing Sheet

(51) Int. Cl.
*B60L 53/31* (2019.01)
*H01M 10/44* (2006.01)

(56) References Cited

U.S. PATENT DOCUMENTS

| | | | |
|---|---|---|---|
| 2012/0013298 A1 | 1/2012 | Prosser | |
| 2012/0153896 A1* | 6/2012 | Rossi | B60L 53/65 307/41 |
| 2013/0110296 A1 | 5/2013 | Khoo et al. | |
| 2013/0141045 A1* | 6/2013 | Karim | H02J 7/342 320/128 |
| 2013/0162221 A1* | 6/2013 | Jefferies | B60L 53/63 320/155 |
| 2013/0335052 A1* | 12/2013 | Li | H02M 3/156 323/285 |
| 2014/0089016 A1* | 3/2014 | Smullin | G06Q 10/02 705/5 |
| 2014/0093760 A1* | 4/2014 | Hermann | H02J 7/0069 429/66 |
| 2014/0125279 A1 | 5/2014 | Juhasz | |
| 2014/0167694 A1* | 6/2014 | Gjinali | B60L 50/66 320/109 |
| 2015/0306970 A1 | 10/2015 | Son | |
| 2015/0336465 A1* | 11/2015 | Luke | B60L 53/68 320/109 |
| 2016/0193932 A1 | 7/2016 | Vaghefinazari | |
| 2017/0158067 A1* | 6/2017 | Reynolds | B60L 53/14 |
| 2017/0158071 A1* | 6/2017 | Reynolds | B60L 53/305 |
| 2017/0158075 A1* | 6/2017 | Reynolds | B60L 53/63 |

FOREIGN PATENT DOCUMENTS

| | | |
|---|---|---|
| CN | 105844432 A | 8/2016 |
| CN | 106671820 A | 5/2017 |
| CN | 107117046 A | 9/2017 |
| DE | 102010040395 A1 | 3/2012 |
| DE | 102011008674 A1 | 7/2012 |
| DE | 102014216878 A1 | 2/2016 |
| WO | 2012/088223 A2 | 6/2012 |
| WO | 2017/096216 A1 | 6/2017 |

OTHER PUBLICATIONS

Examination Report dated Feb. 6, 2020, in corresponding European patent application No. 18200306.1 including partial machine-generated English language translation; 11 pages.
German Office Action dated Feb. 10, 2018 of corresponding application No. DE102017220695.0; 12 pgs.
Office Action dated Sep. 17, 2021, in connection with corresponding Chinese Application No. 201811373071.0 (19 pp., including machine-generated English translation).

* cited by examiner

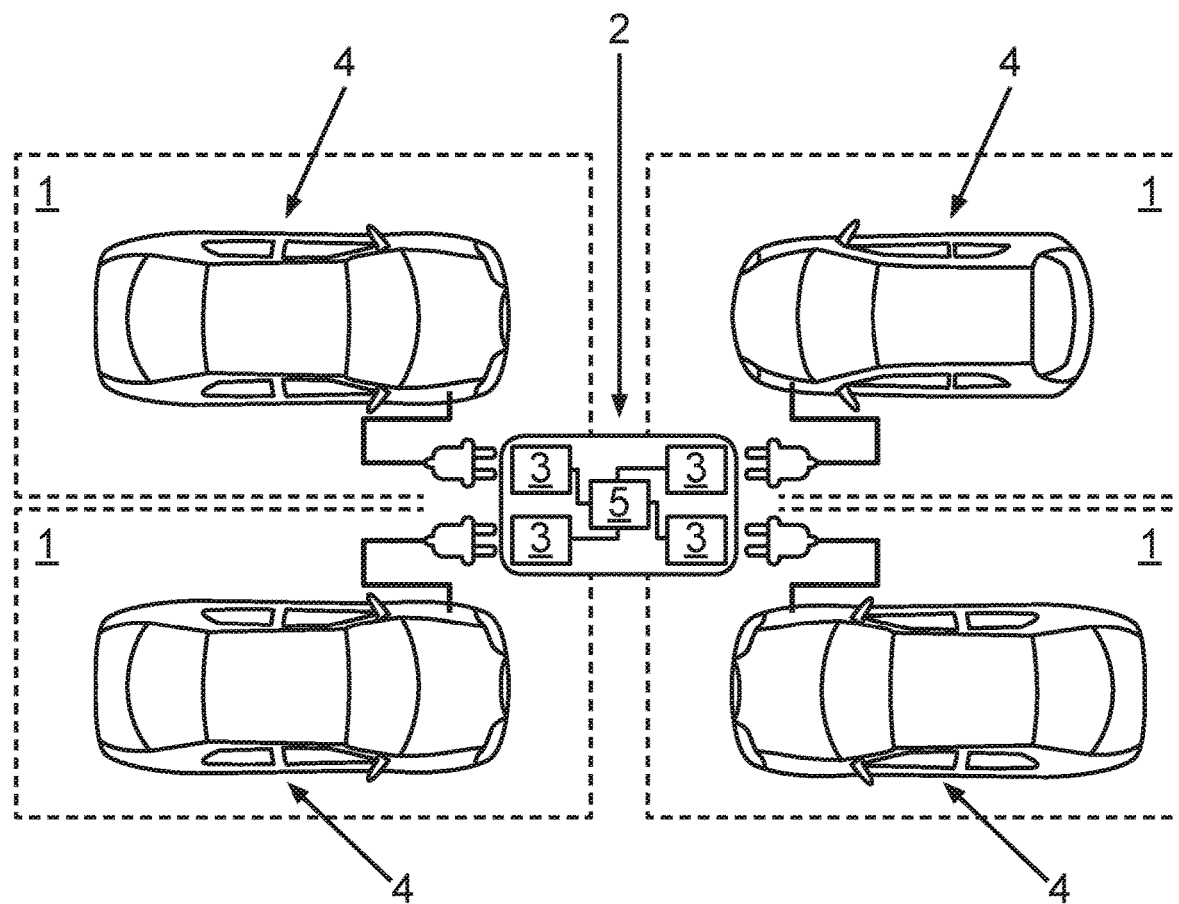

METHOD AND CHARGING COLUMN FOR RECHARGING A PLURALITY OF ELECTRIC VEHICLES

FIELD

The invention relates to a method and a charging column for recharging a plurality of electric vehicles, of the type specified in the preambles of the independent patent claims.

BACKGROUND

Usually, charging columns or stations are designed exclusively for charging electric vehicles. Charging columns usually serve a specific parking space. A vehicle can be parked there for recharging its batteries, whereby, in this case, the charging station concerned is not available for other vehicles for the duration of the charging process. Likewise, of course, the charging station usually cannot be utilized even after the charging process, since the charging column is blocked for the entire time that the respective vehicle is parked, even after charging has been completed.

US 2010/0217485 A1 describes a control device for recharging a plurality of vehicles. In this case, included among other things, it is provided that priority can be established for the individual vehicles to be recharged, whereby the vehicles are recharged corresponding to their predetermined priority.

DE 10 2010 040 395 A1 shows a method for the recharging of vehicle batteries. A common charging station having several individual charging columns and vehicles connected thereto is shown, whereby the common charging station determines a sequence for recharging the individual vehicles.

DE 10 2011 008 674 A1 shows a method for recharging a plurality of vehicles. In this case, it is provided to distribute the maximum available connection power to a plurality of vehicles connected to a charging station according to a vehicle prioritizing.

SUMMARY

The object of the present invention is to provide a solution, by means of which charging columns for the recharging of electric vehicles can be utilized particularly efficiently.

This object is achieved by a method for operating a charging column and by a charging column with the features of the independent patent claims. Advantageous embodiments with appropriate and non-trivial enhancements of the invention are indicated in the dependent claims.

In the method according to the invention for operating a charging column, a plurality of electric vehicles are charged simultaneously at particular connections of the charging column by means of a charging control for the charging column. In this case, it is provided according to the invention that the charging control charges the simultaneously connected electric vehicles exclusively individually.

The charging column is to be understood as a charging option for electric vehicles, and is also often called a charging station. Such charging columns or charging stations are also often designated as service stations or as charging points. The charging column may be both a publicly accessible charging column as well as one that is not publicly accessible, wherein the respective connections of the charging column, for example, in the simplest case, may involve plug sockets, charging cables or also other interfaces, by way of which electrical current can be supplied to electric vehicles connected thereto.

The invention is based on the knowledge that usually, charging columns can be connected to a vehicle only at parking spaces, whereby the charging column concerned is occupied during the entire time that a vehicle is parked. Frequently, because of this, there arises a large difference between the residence time of a vehicle in question at the charging column and an actual period of use of the charging column, thus an actual duration of a charging process. If the charging column is blocked by vehicles that have finished charging, the utilization for an operator of the charging column and the charging column are not available simultaneously for other customers.

In the method according to the invention, in contrast, it is possible to connect a plurality of electric vehicles simultaneously to respective connections of the charging column, wherein all electric vehicles can be charged at the charging column, wherein, according to the invention, this can be done due to the fact that the charging control recharges the simultaneously connected electric vehicles exclusively individually. The charging column can thus be connected to a plurality of electric vehicles and thus also serves a plurality of parking spaces. The charging control determines the sequence by which the electric vehicles are charged.

Due to the fact that the charging control charges the simultaneously connected electric vehicles exclusively individually, a particularly simple charging design results for operating the charging column. A particularly large supply of available charging points is provided to users of electric vehicles by the method according to the invention, since users can drive up to already occupied charging columns and can recharge their vehicle, for example, in a subordinate position. An additional expenditure of time to search for free charging columns can thus be dispensed with; in particular, another approach lane, which is also possibly otherwise associated therewith, can be dispensed with. Also, a particularly high capacity utilization results for the charging columns by the method according to the invention, so that operators of charging columns can operate them particularly efficiently. From the viewpoint of the operator, a utilization ratio of the charging column is optimal if the amount of charge delivered per unit of time is as high as possible. The method according to the invention takes this aspect into account.

One advantageous embodiment of the invention provides that a sequence, according to which the simultaneously connected electric vehicles will be exclusively individually charged, is provided according to a recorded specification of an operator of the charging column. Therefore, an operator of the charging column can specify precisely, in a simple and also arbitrary manner, the sequence according to which electric vehicles that are connected to the charging column will be recharged.

Another advantageous embodiment of the invention provides that the specification of the operator of the charging column is recorded by means of a user interface of the charging column or is received by means of a communications interface of the charging column. For example, it is possible that a touch pad or another input device, by way of which the operator of the charging column can establish in a simple way the sequence that he prefers, is provided at a charging column. For example, he can decide that the first vehicle that is connected is also the first to be charged. Or, he can establish, for example, a prioritizing according to the rate charged for electrical current or any other specification. Alternatively or additionally, it is also possible that the charging column has said communications interface in order to receive a sequence set by the user, for example, by WLAN or also by way of a wireless network. In this case, it would be possible, for example, that the operator of the charging column can establish the sequence by way of a correspondingly suitable program on his smart phone. Of course, other procedures by which the operator of the charging column specifies his preferred sequence and then transmits this to the communications interface of the charging column are also conceivable.

In another advantageous embodiment of the invention, it is provided that the electric vehicles will be recharged sequentially up to a specified charging state, according to the sequence that they have been connected to the charging column. This could appear as follows, for example: The electric vehicle that has been connected first is recharged first to 80 percent. The other vehicles that have been connected afterward will not be recharged during this time. After this, the vehicle that has been connected secondly, is recharged, again up to 80 percent, for example. This procedure continues, for example, until a third and a fourth vehicle have also been recharged up to 80 percent. In the meantime, if one of the vehicles leaves the charging column and a new vehicle is added, the latter is again recharged to 80 percent. If all of the vehicles have been recharged to 80 percent, then the vehicles will now sequentially be recharged to 100 percent, for example. In this way, there also results a particularly simple concept relative to the sequence of how the electric vehicles will be recharged. For example, charging currents or other characteristic quantities or physical values need to be measured and evaluated in an inexpensive, uncomplicated manner, which can considerably facilitate the charging process for the plurality of electric vehicles at one and the same charging column.

According to another advantageous embodiment of the invention, it is provided that the same value for the state of charge is specified for all electric vehicles. The state of charge is to be understood as the nominal state of charge. Once more, a considerable simplification of the concept results with respect to the specification of the sequence and the execution of the charging processes of the individual electric vehicles.

Another advantageous embodiment of the invention provides that, after the specified state of charge for all electric vehicles has been achieved, the electric vehicles are recharged completely sequentially. Therefore, as soon as all electric vehicles have reached the specified state of charge, they can also be completely recharged—presuming that they have remained connected long enough to the charging column.

Another advantageous embodiment of the invention provides that, after the connection of the respective electric vehicles, it is checked whether any of them has an increased priority status, whereby those electric vehicles with increased priority status will be charged first. For example, it is possible that particular users of electric vehicles have selected a specific electricity rate with the operator of the charging column, this rate having a particularly high priority status or a particularly low priority status. In the first case, it may be necessary that the user must pay a somewhat higher rate, while in the latter case, he must pay a somewhat lower rate. Therefore, respective users of the electric vehicles themselves can select which rate they want to pay in order to determine whether they will be recharged with high or low priority at the charging station. In this way, there also results a particularly simple specification of the sequence for the electric vehicles connected each time to the charging column, with respect to their individual charging processes.

The charging column according to the invention comprises a plurality of connections for the simultaneous connection of a plurality of electric vehicles and a charging control that is equipped for the purpose of charging the electric vehicles simultaneously connected to the respective connections, wherein the charging column according to the invention is characterized in that the charging control is equipped for the purpose of exclusively individually charging the simultaneously connected electric vehicles. Advantageous embodiments of the method according to the invention are to be viewed as advantageous embodiments of the charging column according to the invention, and vice versa, wherein the charging column, in particular, has means for conducting the method steps according to the invention.

An advantageous embodiment of the charging column according to the invention provides that the connections and the charging control are assembled in a retrofittable expansion module. Conventional charging columns can be retrofitted thereby in a simple way, by installing the expansion module, and thus can be upgraded so that a charging column at which originally only a single vehicle could be connected and recharged, after adding the expansion module, is now equipped to serve a plurality of electric vehicles. However, it is also equally well possible that the connections and the charging control are integrated from the start into the charging column; thus they are installed during the manufacture thereof.

According to another advantageous embodiment of the charging column, it is provided that at least one of the connections is designed as a connection operating at lower priority, whereby the charging control is equipped for the purpose of recharging an electric vehicle connected at this connection with lower priority than the electric vehicles connected to the remaining connections. Said connection can be characterized correspondingly, for example, so that it is optically emphasized in a simple way as a connection operating in subordinate position. This can be produced, for example, by a corresponding labeling and/or also a corresponding coloring. If an electric vehicle is connected to the connection that operates at lower priority, then initially, the other vehicles that have been connected to the remaining connections are recharged first and with higher priority. For example, should these vehicles have reached a specific state of charge or have been completely recharged, only then is recharged the electric vehicle that has been connected to the connection operating at lower priority. In this connection, for example, it may be provided that the charging process at the connection operating at lower priority is less expensive, so that users have the option of being able to recharge their electric vehicles at a lower cost. This can make sense, for example, if a user of the electric vehicle knows that he would like to leave his vehicle connected to the charging column for the whole day, for example, since he has parked his vehicle at said charging column at his workplace. In this case, the probability might be relatively high that his electric vehicle will be recharged completely only because of the long residence time at the charging column, when he has connected the electric vehicle to the connection operating at lower priority.

According to another advantageous embodiment of the charging column, it is provided that the charging column has a user interface at which a user can choose that his electric vehicle will be charged at low priority and/or at a discounted rate, whereby the charging control is equipped for the purpose of recharging this electric vehicle at lower priority than the electric vehicles connected at the other connections. In this case, a user thus has the possibility to specify, by way of the user interface of the charging column, whether his electric vehicle shall be recharged at lower priority and/or at a discounted rate. The particular user of the electric vehicle can thereby participate in determining the sequence of the charging process in a simple way, and thus also optionally save money thereby.

Other advantages, features and details of the invention result from the following description of a preferred example of embodiment and based on the drawing. The features and combinations of features named above in the description, as well as the features and combinations of features named below in the description of the FIGURES and/or in the FIGURES alone can be used not only in the combination indicated in each case, but also in other combinations or alone, without departing from the scope of the invention.

BRIEF DESCRIPTION OF DRAWING

In the FIG. 1, the drawing shows a schematic representation of a charging column that is surrounded by four parking spaces, at which respective electric vehicles are parked and have been connected to the charging column.

DETAILED DESCRIPTION

Four parking spaces 1, which surround a charging column 2, are shown schematically in the single FIGURE. The charging column 2 comprises four connections 3, at which are connected respective electric vehicles 4, which are parked at the respective parking spaces 1. The charging column 2 comprises, in addition, a charging control 5 that is equipped for the purpose of actuating the individual connections 3 in order to recharge the respective electric vehicles 1.

Due to the fact that the charging column 2 has four connections 3, the charging column 2 that equally serves the four parking places 1 and the electric vehicles 4 parked therein, thus can recharge the electric vehicles 4. The charging control 5 charges the simultaneously connected electric vehicles 4 exclusively individually in this case. It is possible, for example, in this case, that an operator of the charging column 2 can specify a sequence himself, according to which the simultaneously connected electric vehicles 4 are charged exclusively individually.

For this, at the charging column 2, for example, a user interface, in the form of a touch pad, a touch screen, or the equivalent, for example, which is not shown in more detail here, can be provided. By way of the user interface, the operator of the charging column 2 can establish in a simple way the sequence that he prefers, according to which, the respective electric vehicles 4 shall be recharged, as long as they have been connected to the charging column 2.

Alternatively or additionally, it is also possible that a communications interface, which is not shown in more detail here, of the charging column 2 receives a particular specification from the operator of the charging column 2 with respect to a sequence that he prefers. Therefore, the operator of the charging column 2 can specify the sequence that he prefers, for example, by way of a corresponding app on his smart phone. It is also certainly conceivable that the operator specifies the sequence, for example, in a browser-based manner or by way of a corresponding program on his PC, whereby information and data with respect to this will then be transmitted to the communications interface of the charging column 2.

Further, it is also possible that the electric vehicles 4 that have been connected, one after the other, to the charging column 2 according to a sequence are simply also recharged sequentially up to a specified state of charge. For example, it is possible that electric vehicles 4 will be recharged up to 80 percent at first individually, one after the other, according to their sequence of connection to the charging column 2; their respective traction batteries thus are recharged up to SOP 80 percent. After all batteries of the electric vehicles 4 have been recharged up to 80 percent SOP, they are then completely recharged one after the other, for example, as long as the electric vehicles 4 remain connected to the charging column for a long enough time.

In addition, it is also possible that, after the connection of the respective electric vehicles 4, it is checked whether any of them has an increased priority status, whereby those electric vehicles 4 with an increased priority status will be charged first. Thus, it is conceivable, for example, that particular users of the electric vehicles 4 can agree on different rates with the operator of the charging column 2, from a particularly favorable rate up to a particularly expensive rate. In the first case, it is conceivable, for example, that a particularly low priority or a particularly low priority status is assigned to these users and thus to their electric vehicles 4, with respect to a charging process at the charging column 2. In the case where the user of the particular electric vehicle 4 has selected a particularly high rate, then it is conceivable that in this case, the electric vehicle 4 in question is provided with a particularly high priority status and, in fact, will be charged first in a prioritized and ideal way It is also possible that at least one of the connections 3 is designed as a connection operating at lower priority and is also characterized optically in corresponding manner. The charging control 5 in this case is equipped for the purpose of charging an electric vehicle 4 connected at this connection 3 with lower priority than the electric vehicles 4 connected at the remaining connections 3. Thus, a user of one of the electric vehicles 4 sees in a simple way at which of the connections 3 he must connect his electric vehicle 4, if it suffices for him that his electric vehicle 4 will be recharged at a lower priority than at the other connections 3, thus in a subordinate position. This may be the case then, for example, if the user of the electric vehicle 4 in question knows that he can leave his electric vehicle 4 connected at the charging column 2 for the whole day. In connection with the lower prioritizing of his electric vehicle 4 for charging at the charging column 2, it may also be provided that he needs to pay less for the charging process.

Finally, it is also possible that the charging column 2 has a user interface, which is not shown in more detail here, at which a user can choose that his electric vehicle 4 shall be charged at lower priority and/or at a discounted rate. In this case, the charging control 5 is equipped for the purpose of recharging this electric vehicle 4 at lower priority than the electric vehicles 4 connected to the remaining connections. In this case, it is thus possible in variable ways to grant a lower priority to the respective connections 3 by having a user of an electric vehicle 4 in question simply specify by way of said user interface, whether his electric vehicle 4 shall be charged at lower priority, thus subordinately, and preferably in connection also with a discounted rate.

In the case of the described method for operating the charging column 2, it is possible, in a particularly simple way without great expenditure, to recharge a plurality of electric vehicles 4 that are parked at different parking places 1, employing one and the same charging column 2. An essential point in this case is the particularly simple concept, according to which the sequence for recharging the individual electric vehicles 4 can be established.

The individual connections 3 and the charging control 5 may also be assembled as a retrofittable expansion module. Thus, it is possible, for example, to expand in a simple way charging columns that up to now have not been designed for the simultaneous connection of a plurality of electric vehicles 4, by installing the expansion module, so that the charging columns in question can be operated in the same way as the charging column 2 designed here. Of course, it is also possible that the connections 3 and the charging control 5 will be provided from the start, during the manufacture of charging column 2.

The invention claimed is:

1. A method for operating a charging column, in which a plurality of electric vehicles that are simultaneously connected at respective connections of the charging column are charged by a charging control of the charging column,
   wherein the charging control charges the simultaneously connected electric vehicles exclusively individually,
   wherein the simultaneously connected electric vehicles are each charged up to a predetermined state of charge according to a sequence, the predetermined state of charge being less than a full state of charge,
   wherein the simultaneously connected electric vehicles are then charged from the predetermined state of charge to the full state of charge according to the sequence only when all of the simultaneously connected electric vehicles have been first charged to the predetermined state of charge, and
   wherein, in a case in which the simultaneously connected vehicles have each been charged up to or above the predetermined state of charge and in which a new vehicle is connected to the charging column, the new vehicle having a state of charge less than the predetermined state of charge, charging of the simultaneously connected vehicles to the full state of charge is interrupted and halted when the new vehicle is connected and until the new vehicle is charged up to the predetermined state of charge.

2. The method according to claim 1, wherein the sequence is provided according to a recorded specification of an operator of the charging column.

3. The method according to claim 2, wherein the specification of the operator of the charging column is recorded by a user interface of the charging column or is received by a communications interface of the charging column.

4. The method according to claim 1, wherein the sequence corresponds to an order in which each of the simultaneously connected electric vehicles were each connected to the charging column.

5. The method according to claim 1, wherein the predetermined state of charge is the same value for all electric vehicles.

6. The method according to claim 1, wherein after the connection of the respective electric vehicles, it is checked whether any of them has an increased priority status, whereby those electric vehicles with increased priority status will be charged first.

7. A charging column, comprising a plurality of connections for the simultaneous connection of a plurality of electric vehicles and a charging control that is equipped for the purpose of charging the electric vehicles simultaneously connected to the respective connections,
   wherein the charging control is equipped for the purpose of charging the simultaneously connected electric vehicles exclusively individually,
   wherein the simultaneously connected electric vehicles are each charged up to a predetermined state of charge according to a sequence, the predetermined state of charge being less than a full state of charge,
   wherein the simultaneously connected electric vehicles are then charged from the predetermined state of charge to the full state of charge according to the sequence only when all of the simultaneously connected electric vehicles have been first charged to the predetermined state of charge, and
   wherein, in a case in which the simultaneously connected vehicles have each been charged up to or above the predetermined state of charge and in which a new vehicle is connected to the charging column, the new vehicle having a state of charge less than the predetermined state of charge, charging of the simultaneously connected vehicles to the full state of charge is interrupted and halted when the new vehicle is connected and until the new vehicle is charged up to the predetermined state of charge.

8. The charging column according to claim 7, wherein the connections and the charging control are assembled in a retrofittable expansion module.

9. The charging column according to claim 7, wherein at least one of the connections is designed as a connection operating in subordinate position, wherein the charging control is equipped for the purpose of recharging an electric vehicle connected to this connection at lower priority than the electric vehicles connected to the other connections.

10. The charging column according to claim 7, wherein the charging column has a user interface at which a user can choose that his electric vehicle will be charged at lower priority and/or at a discounted rate, wherein the charging control is equipped for the purpose of recharging this electric vehicle at lower priority than the electric vehicles connected to the other connections.

11. The charging column according to claim 7, wherein the sequence is provided according to a recorded specification of an operator of the charging column.

12. The charging column according to claim 11, wherein the specification of the operator of the charging column is recorded by means of a user interface of the charging column or is received by means of a communications interface of the charging column.

13. The charging column according to claim 7, wherein the sequence corresponds to an order in which each of the simultaneously connected electric vehicles were each connected to the charging column.

14. The method according to claim 1, wherein the predetermined state of charge is 80% of the full state of charge.

15. The charging column according to claim 7, wherein the predetermined state of charge is 80% of the full state of charge.

* * * * *